Sept. 13, 1955     H. S. ALEXANDER     2,717,529
LIGHT PROJECTOR ATTACHMENT
Filed Dec. 16, 1952     2 Sheets-Sheet 1
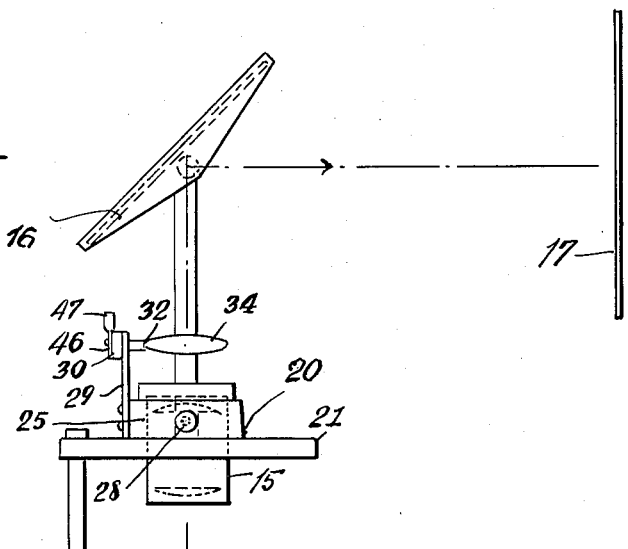
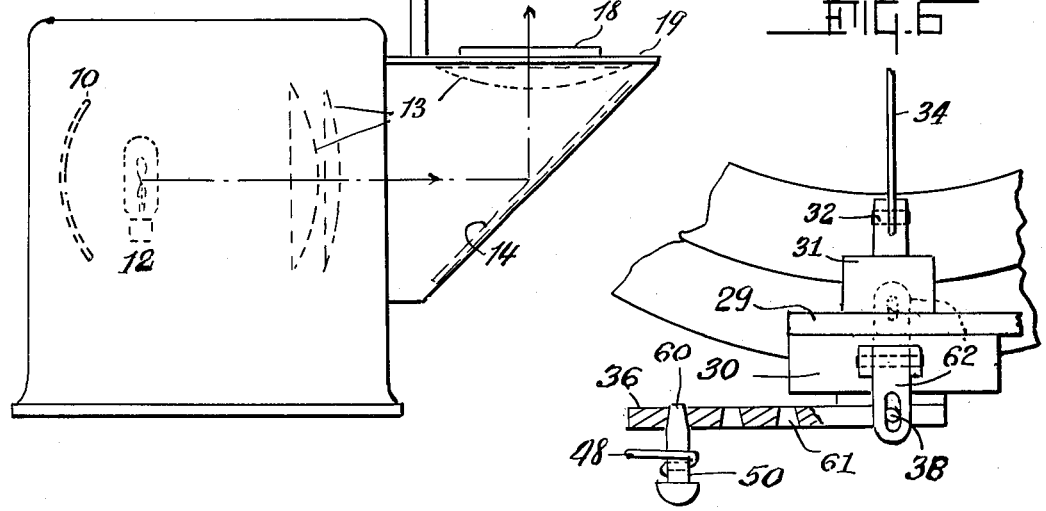
INVENTOR.
Henry S. Alexander
BY
Ivan E. G. Konigsberg
att.

Sept. 13, 1955  H. S. ALEXANDER  2,717,529
LIGHT PROJECTOR ATTACHMENT
Filed Dec. 16, 1952  2 Sheets-Sheet 2
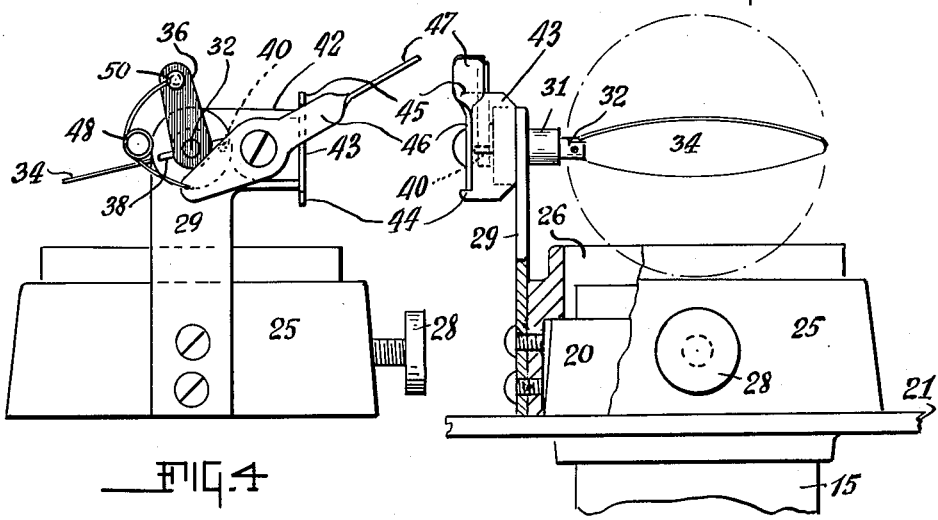
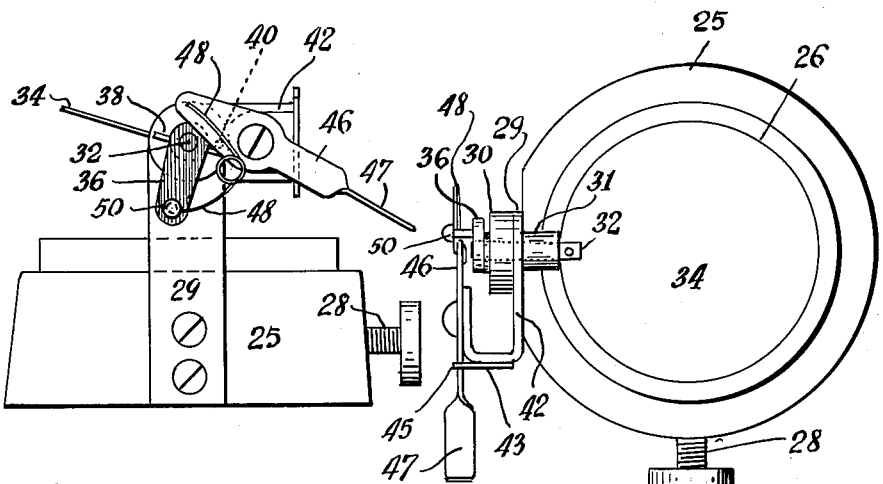
INVENTOR.
Henry S. Alexander
BY United States Patent Office 2,717,529
Patented Sept. 13, 1955

2,717,529

LIGHT PROJECTOR ATTACHMENT

Henry S. Alexander, Meadville, Pa., assignor to Keystone View Company, Meadville, Pa., a corporation of Pennsylvania Application December 16, 1952, Serial No. 326,187

1 Claim. (Cl. 88—20)

This invention relates to a device for use in visual training for the purpose of developing more effective seeing, quick and more accurate visual perception and increased speed and comprehension in reading.

The device is in the form of a butterfly type flashmeter shutter to be used with a projection apparatus. The images of pictorial or other representations on specially prepared slides are projected upon a screen and by means of the flashmeter shutter the images appear to the subject in the form of momentary flashes. The subject records or reports the visual impression or how much or what he has seen or perceived from the flash picture. In the beginning the subject will not be able to state that the entire image has been perceived, but after a suitable period of training the subject's visual abilities will improve so that he will be able to see more and more of the projected image. His seeing capacity is developed and he obtains more accurate visual perception and increased speed in reading, etc.

The object of the invention is to provide a butterfly type flashmeter shutter adapted to be mounted upon a projection apparatus at a point where the image of the shutter is not projected. Another object is to provide a shutter whereby projected images may be observed as flashed presentations upon a screen. Another object is to provide such a device of very simple and efficient construction operable both in professional training and in home training. Still another object is to provide means for varying the speed of the shutter and also maintain the shutter in fully open position.

Accordingly the invention is embodied in a shutter device as hereinafter described and claimed and as illustrated in the accompanying drawings in which:

Fig. 1 is a general outline side view of a projection apparatus equipped with a shutter device embodying the invention.

Fig. 2 is a side view of the device with parts in section and parts broken away.

Fig. 3 is a plan view.

Figs. 4 and 5 are rear views showing the shutter in two different positions.

Fig. 6 shows a modification.

The projection apparatus in Fig. 1 is shown conventionally with a housing containing a reflector 10, a lamp 12, condenser lenses all marked 13, a reflecting mirror 14, an objective lens assembly 15, a second reflecting mirror 16 and a projection screen 17. Picture slides 18 are placed upon a stage 19 and are projected upon the screen in a well known manner. The lens assembly 15 is supported within a collar 20 of a shelf 21 which is part of the projector.

Referring now to Figs. 2–5, the butterfly flashmeter device comprises a base ring 25 forming an exposure opening 26. The ring fits around the collar 20 and is detachably secured by a thumb screw 28. To one side of the ring there is secured an upright 29 with bearings 30 and 31 for the shutter spindle 32. The latter carries a shutter disk 34 over the opening 26. The other end of the spindle carries a crank 36 having a stop pin 38 adapted to engage on both sides of a stop 40 in the fixed bearing 30.

The upright 29 carries or forms a support 42 to which is secured a stop plate 43 with two stops 44 and 45. On the support 42 there is also pivoted a tripping lever 46 having a finger plate 47 at its outer end. The opposite end is connected to the crank 36 by a spring 48 secured in a pin 50.

In operation, when the tripping lever 46 is moved by a light finger touch between the stops 45 and 44 from the upper position in Fig. 4 to the lower position in Fig. 5, and vice versa, the spring 48 is correspondingly actuated to cause a quick snaplike movement of the crank 36 through an arc of nearly 180 degrees. The stop pin 38 then hits the stop 40 on the other side thereof and the crank is stopped in the lower position, the shutter having made a quick almost complete revolution thereby exposing the projected picture upon the screen for a momentary flashlike view by the subject. The shutter moves counterclockwise from Fig. 4 to Fig. 5 and vice versa when the tripping lever is raised against the stop 45.

The picture slide may carry a single word, or a letter, or a picture or parts thereof. Whatever image is flashed upon the screen is seen by the subject in a mere fraction of a second. As the training proceeds the subject will be able to perceive more and more of the flash picture and his seeing will improve.

It may be desirable to vary the speed of the shutter. This may be done by adjusting the pin 50 in the crank 36. An example of such a modification is shown in Fig. 6 in which the pin 50 has a cone shaped inner end 60 which fits into cone shaped holes 61 in the crank. By shifting the pin from one hole to another hole the movement of the crank and the shutter may be adjusted.

Sometimes it is desirable that the shutter remain fully open for some time. The fully open position is indicated by the dotted line in Fig. 2. A very simple arrangement permits this to be done. By moving the crank 36 into a horizontal position as shown in Fig. 6 the stop pin 38 will take a vertical position and may be held thereby merely swinging a hinged slotted latch 62 from the position shown dotted in Fig. 6 in over the pin 38 to engage the same. The shutter will then remain open. When the latch is swung back away from the pin 38, the crank will immediately be automatically restored to either the upper or the lower position ready for flash operation.

When the shutter is held open it is not imaged upon the screen as will be understood. The light is cut down very little and is not detectable during the operation.

The device is extremely flexible and delicate in its operation, yet the various elements are sturdy and easily operated. The entire device may be detached from the projector by loosening the thumb screw and the device is equally easily attached to the projector. The use of the device fills a void in visual training programs in which its use has proven highly successful.

I claim:

A light projector attachment for a projector having an optical lens system for producing intermittent images of objects upon a screen with an image projecting lens unit between the objects and the screen and the casing enclosing and supporting the lens unit; said attachment comprising an imperforate shutter disk and means for operating and detachably supporting the attachment in the optical system of the projector comprising an annular base supportable upon and enclosing said lens unit casing and forming an exposure opening above the lenses therein; means in said base engaging said lens unit casing for detachably mounting the attachment upon the said projector in operative relation to the projector optical system between the lenses and the screen; an upright support fixed to the one side of said base; a rotatable shaft on said upright support; means for securing the said imperforate shutter disk to said shaft to extend over said exposure opening above the same with the center of said disk in fixed axial alinement with the axes of the exposure opening and the projector lens unit; said shaft with the shutter disk thereon being operable rotatably with relation to the exposure opening and said lens unit for momentarily causing a projection of images of the objects to appear upon the screen in the manner of flashlike picture projection of the objects; a manually actuated shutter disk tripping lever pivoted on said upright support; spring actuated means secured to and between said tripping lever and said shaft to rotate the latter with the shutter when the tripping lever is actuated and fixed stop means on said upright engageable by said tripping lever to limit the movements of the tripping lever and said spring actuated means to position the said shutter disk in either a closed or in an open position with relation to the said exposure opening and said lens unit.

References Cited in the file of this patent

UNITED STATES PATENTS

| | | |
|---|---|---|
| 439,420 | McIntosh | Oct. 28, 1890 |
| 1,593,687 | Bornmann | July 27, 1926 |
| 1,981,587 | Dorsey | Nov. 20, 1934 |
| 2,410,237 | Renshaw | Oct. 29, 1946 |
| 2,498,294 | Pennow et al. | Feb. 21, 1950 |
| 2,590,101 | Henschke et al. | Mar. 25, 1952 |